(12) United States Patent
Owejan et al.

(10) Patent No.: US 7,960,062 B2
(45) Date of Patent: Jun. 14, 2011

(54) ANODE ACCUMULATION TANK WITH HIGH NITROGEN CONCENTRATION BLEED FOR A FUEL CELL STACK FUEL DELIVERY SYSTEM

(75) Inventors: Jon P. Owejan, Honeoye, NY (US);
John C. Fagley, Victor, NY (US);
Steven G. Goebel, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1165 days.

(21) Appl. No.: 11/671,017

(22) Filed: Feb. 5, 2007

(65) Prior Publication Data
US 2008/0187793 A1    Aug. 7, 2008

(51) Int. Cl.
*H01M 8/04* (2006.01)
(52) U.S. Cl. .......................... 429/415; 429/462
(58) Field of Classification Search ................... 429/415
See application file for complete search history.

(56) References Cited

U.S. PATENT DOCUMENTS

| | | | |
|---|---|---|---|
| 5,366,818 A * | 11/1994 | Wilkinson et al. | 429/414 |
| 5,641,586 A * | 6/1997 | Wilson | 429/480 |
| 6,689,499 B2 | 2/2004 | Gillett et al. | |
| 7,087,333 B2 | 8/2006 | Schafer | |
| 2002/0057066 A1 * | 5/2002 | Autenrieth et al. | 318/101 |
| 2004/0166383 A1 | 8/2004 | Schafer | |
| 2005/0003257 A1 | 1/2005 | Willimowski et al. | |

OTHER PUBLICATIONS

U.S. Appl. No. 11/068,489, filed Feb. 28, 2005, Vyas.
U.S. Appl. No. 11/463,384, filed Aug. 9, 2006, Gerhard Winter et al.
U.S. Appl. No. 11/463,386, filed Aug. 9, 2006, Gerhard Winter et al.

* cited by examiner

*Primary Examiner* — Patrick Ryan
*Assistant Examiner* — Brent Thomas
(74) *Attorney, Agent, or Firm* — Fraser Clemens Martin & Miller LLC; J. Douglas Miller

(57) ABSTRACT

A fuel cell system is described having a fuel cell stack including a PEM fuel cell having an anode and a cathode, the fuel cell stack further including an anode outlet and an anode inlet, a hydrogen storage device in communication with the anode inlet and configured to supply a hydrogen gas to the fuel cell stack, and an accumulation reservoir in communication with the anode outlet of the fuel cell stack. The accumulation reservoir is configured to accumulate a quantity of water and an exhaust stream including the hydrogen gas during a purge event and resupply the exhaust stream to the fuel cell stack after the purge event is complete. The accumulation reservoir can be a second fuel cell stack. A method of operating the fuel cell system is also provided.

16 Claims, 4 Drawing Sheets

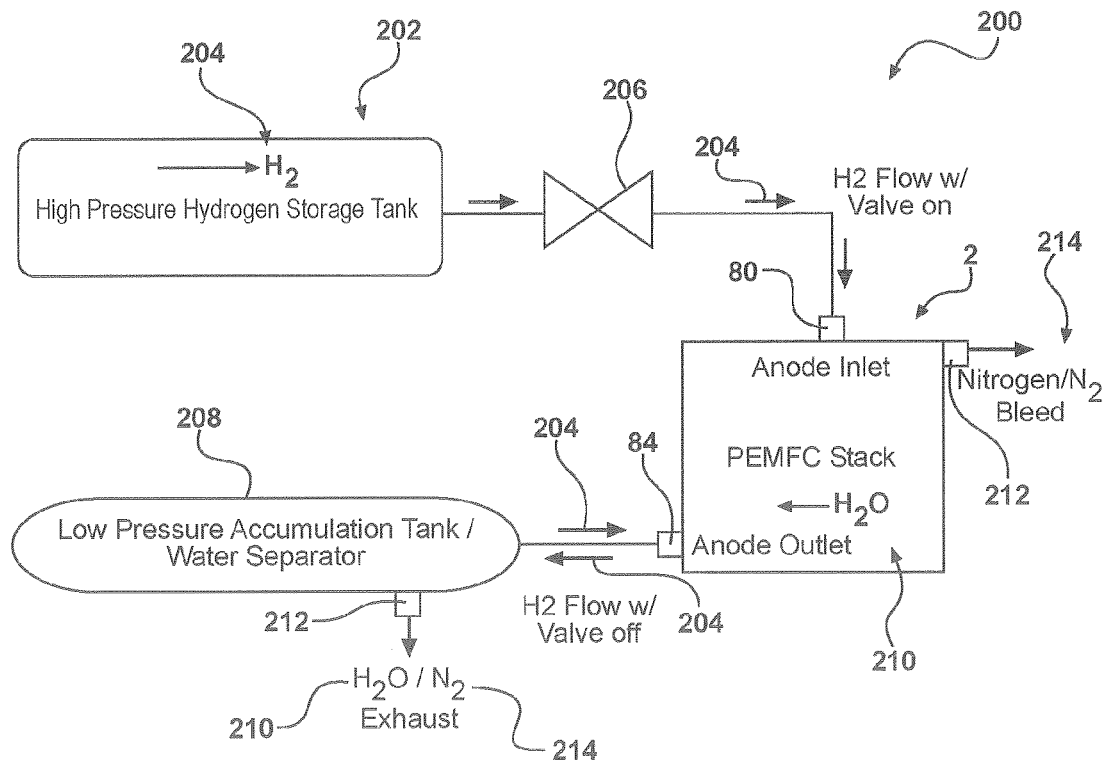
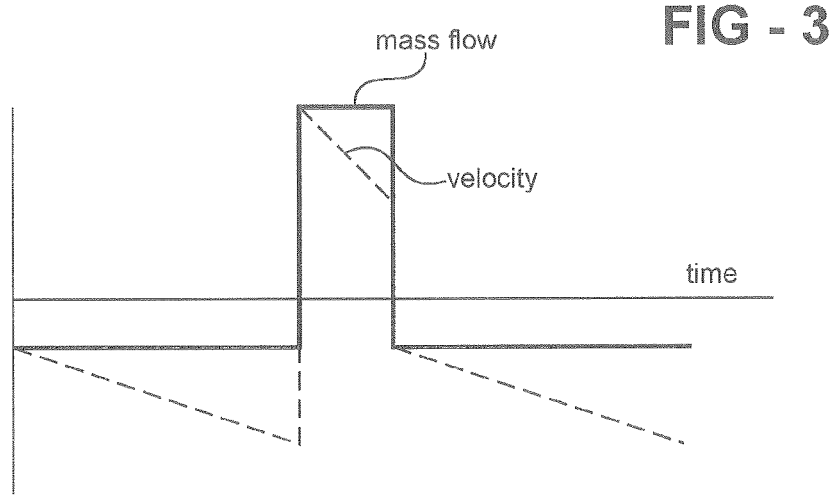

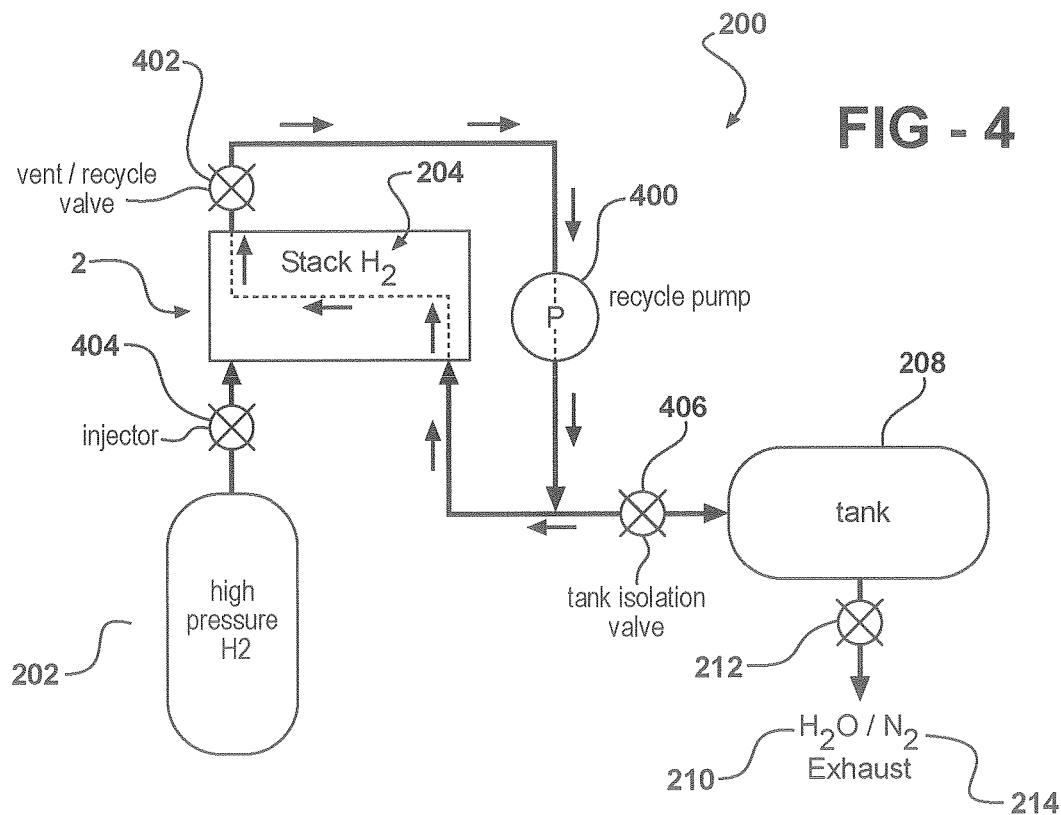
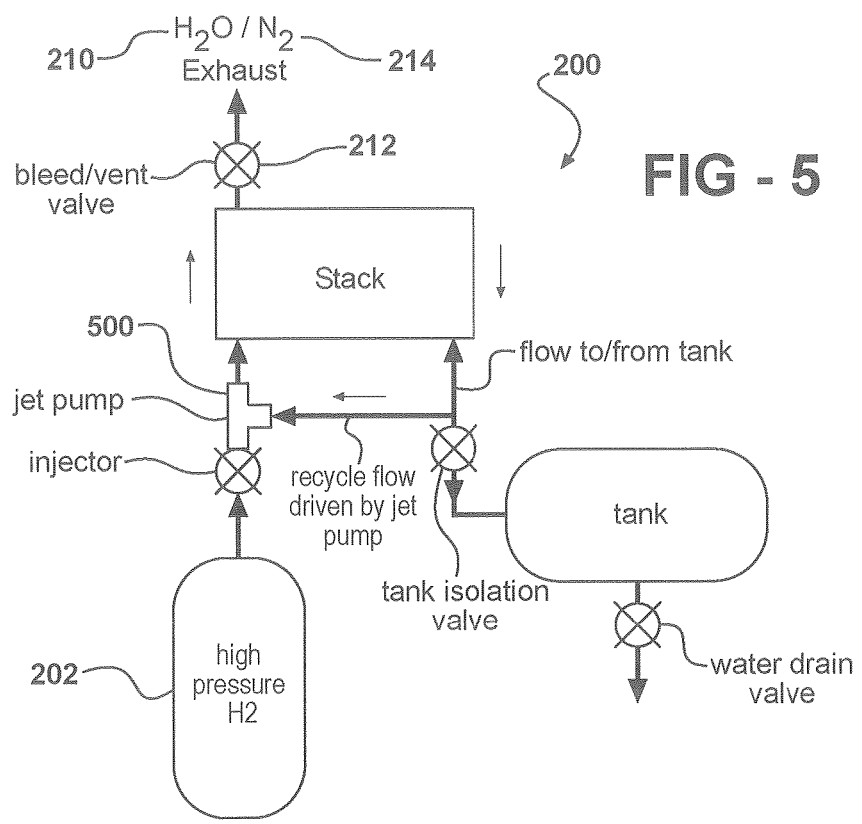

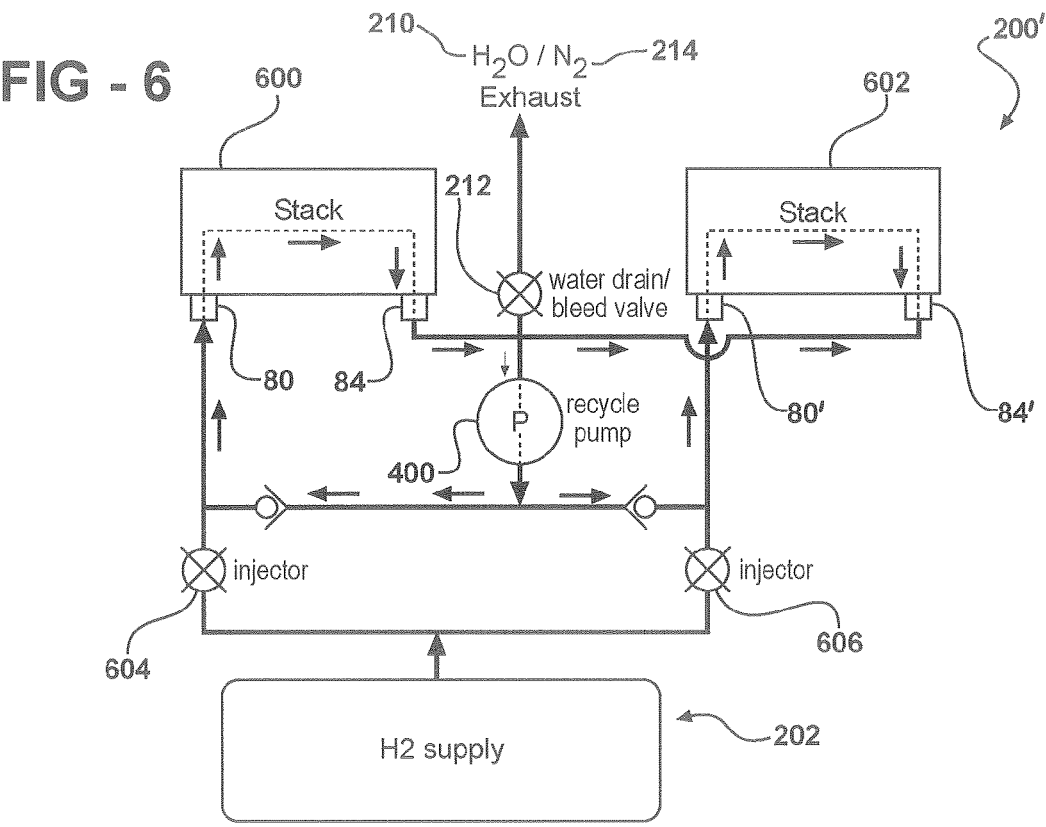
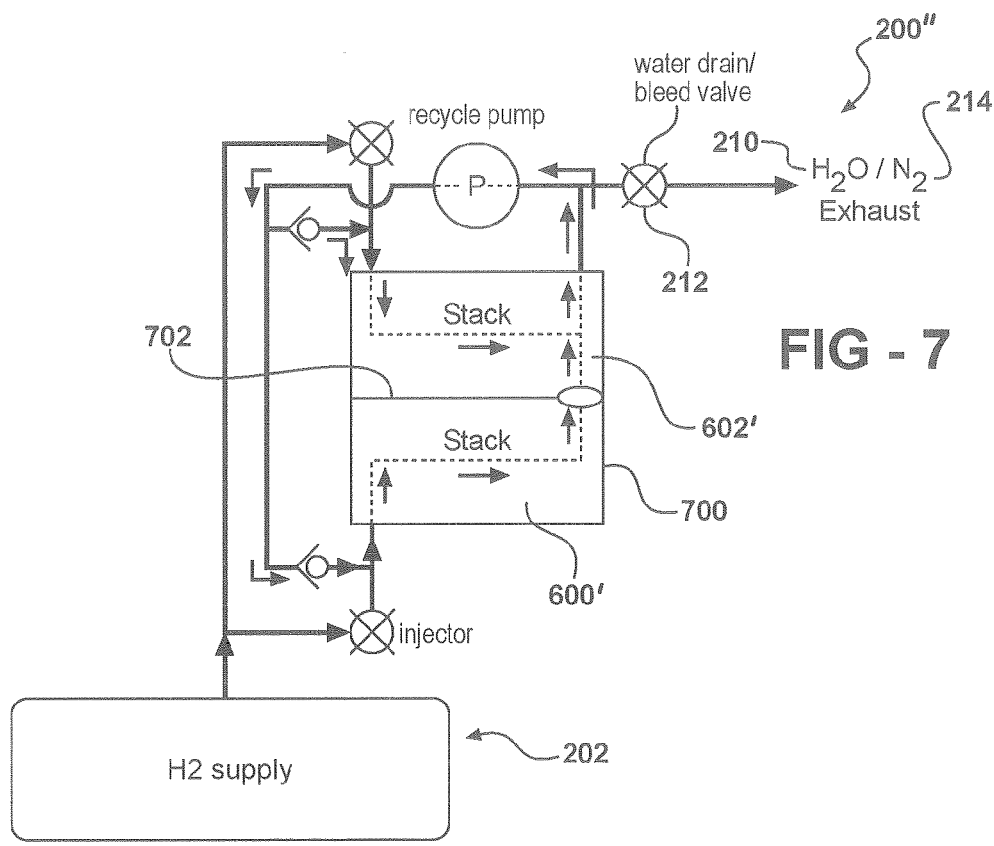

ANODE ACCUMULATION TANK WITH HIGH NITROGEN CONCENTRATION BLEED FOR A FUEL CELL STACK FUEL DELIVERY SYSTEM

FIELD OF THE INVENTION

The present invention relates to fuel cell systems and more particularly to a method for inhibiting liquid water stagnation in fuel cell systems.

BACKGROUND OF THE INVENTION

Fuel cells have been proposed as a clean, efficient and environmentally responsible power source for electric vehicles and various other applications. One example of a fuel cell is the Proton Exchange Membrane (PEM) fuel cell. The PEM fuel cell includes a membrane-electrode-assembly (MEA) that generally comprises a thin, solid polymer membrane-electrolyte having a catalyst and an electrode, for example an anode or a cathode, on both faces of the membrane-electrolyte.

The MEA generally comprises porous conductive materials, also known as gas diffusion media, which form the anode and cathode layers. Fuel, such as hydrogen gas, is introduced at the anode where it reacts electrochemically in the presence of the catalyst to produce electrons and hydrogen cations. The electrons are conducted from the anode to the cathode through an electrical circuit. Simultaneously, the hydrogen cations pass through the electrolyte to the cathode where an oxidant, such as oxygen or air, reacts electrochemically in the presence of the electrolyte and catalyst to produce oxygen anions. The oxygen anions react with the hydrogen cations to form water as a reaction product.

The MEA is generally interposed between a pair of electrically conductive contact elements or bipolar plates to complete a single PEM fuel cell. Bipolar plates serve as current collectors for the anode and cathode, and have appropriate flow channels and openings formed therein for distributing the fuel cells gaseous reactants (i.e., the $H_2$ & $O_2$/air) over the surfaces of the respective electrodes. Typically, bipolar plates also include inlet and outlet headers which, when aligned in a fuel cell stack, form internal supply and exhaust manifolds for directing the fuel cells gaseous reactants, water and liquid coolant to and from, respectively, a plurality of anodes and cathodes.

It is known that membranes within a fuel cell need to have a certain relative humidity to maintain an ionic resistance across the membrane within a desired range to effectively conduct protons. Generally, if the humidity is too high, the flow channels can become blocked by an accumulation of liquid water in a phenomenon known as "water stagnation." Such water stagnation can inhibit or prevent the flow of the gaseous reactants and seriously impair the performance of the fuel cell.

Fuel cell systems of the art can employ hydrogen at a pressure or velocity sufficient to push liquid water out of the system and minimize water stagnation. However, since an anode stoichiometric ratio of about 1.0 to about 1.05 is required for optimum fuel utilization, employing hydrogen at the sufficient pressure or velocity reduces the fuel cell efficiency. To increase anode gas velocity without sacrificing the fuel utilization efficiency, a number of anode architectures have been investigated. These architectures have included flow shifting, stack order switching, and anode recirculation. Flow shifting involves an alternating flow of hydrogen gas through a first stack and a second stack connected in series, wherein the direction of the flow through the stacks alternates. Stack order switching involves an alternating flow of hydrogen gas through a first stack to a second stack connected in series, wherein the direction of flow through the fuel cell stacks remains constant. Anode recirculation involves a recycling of anode exhaust gases back through the anode for consumption of residual hydrogen gas. However, for reasons relating to effectiveness, efficiency, and durability, these individual architectures have proved to provide an insufficient gas velocity.

Nitrogen accumulation on the anode due to cross-over from the cathode can also create localized regions of hydrogen starvation in a phenomenon known as "nitrogen stagnation." Typically, the nitrogen on the anode will accumulate to an undesirable level as the hydrogen fuel is consumed. This accumulation is a present in all of the anode architectures, necessitating the use of a bleed valve that vents recirculating anode gases before the undesirable nitrogen levels are reached.

There is a continuing need for an anode architecture that will remove accumulating water more effectively and efficiently, and that will involve a simplified fuel cell system. Desirably, the method will include an opportunity to effectively bleed accumulating inert gases from the anode of the fuel cell stack.

SUMMARY OF THE INVENTION

In concordance with the instant disclosure, a fuel cell system that exhausts accumulating inert gases, effectively and efficiently removes accumulating water, and may include a single fuel cell stack is surprisingly discovered.

In one embodiment, a fuel cell system includes a fuel cell stack having a PEM fuel cell with an anode and a cathode, the fuel cell stack further including an anode outlet and an anode inlet. The fuel cell system further includes a hydrogen storage device in communication with the anode inlet and configured to supply a hydrogen gas to the fuel cell stack, and an accumulation reservoir in communication with the anode outlet of the fuel cell stack. The accumulation reservoir is configured to collect a quantity of water and an exhaust stream including the hydrogen gas during a purge event and resupply the exhaust stream to the fuel cell stack.

In another embodiment, the fuel cell system includes a first fuel cell stack having a first anode inlet and a first anode outlet, a second fuel cell stack having a second anode inlet and a second anode outlet, and a hydrogen storage device in communication with the first anode inlet and the second anode inlet and configured to supply a hydrogen gas to the first fuel cell stack and the second fuel cell stack on an individual basis. The second fuel cell stack is further configured to be pressurized with an exhaust stream including the hydrogen gas during a purge event of the first fuel cell stack and to resupply the exhaust stream to the first fuel cell stack. Similarly, the first fuel cell stack is configured to be pressurized with an exhaust stream including the hydrogen gas during a purge event of the second fuel cell stack and resupply the exhaust stream to the second fuel cell stack.

In a further embodiment, a method of operating a fuel cell system is provided that includes supplying a fuel cell having an anode with a hydrogen gas from a hydrogen storage device, wherein a pressure from the hydrogen gas militates against an accumulation of a quantity of water on the anode, collecting the water and an exhaust stream including the hydrogen gas in an accumulation reservoir, and resupplying the exhaust stream collected in the accumulation reservoir to the fuel cell.

DRAWINGS

The above, as well as other advantages of the present disclosure, will become readily apparent to those skilled in the art from the following detailed description, particularly when considered in the light of the drawings described hereafter.

FIG. 2 shows a schematic diagram of a PEM fuel cell system having an accumulation tank;

FIG. 3 shows a graphical illustration of removal of accumulated water with a velocity of a hydrogen gas through an anode of a PEM fuel cell system;

FIG. 4 shows a schematic diagram of a PEM fuel cell system having the accumulation tank illustrated in FIG. 2 and a recycle pump;

FIG. 5 shows a schematic diagram of a PEM fuel cell system having the accumulation tank illustrated in FIG. 2 and a jet pump;

FIG. 6 shows a schematic diagram of a PEM fuel cell system having a two stack architecture, with the fuel cell stacks alternately functioning as an accumulation reservoir; and FIG. 7 shows a schematic diagram of a PEM fuel cell system having a partitioned stack architecture, with the partitioned portions of the fuel cell stack alternately functioning as an accumulation reservoir.

DETAILED DESCRIPTION OF THE INVENTION

Figure 1:
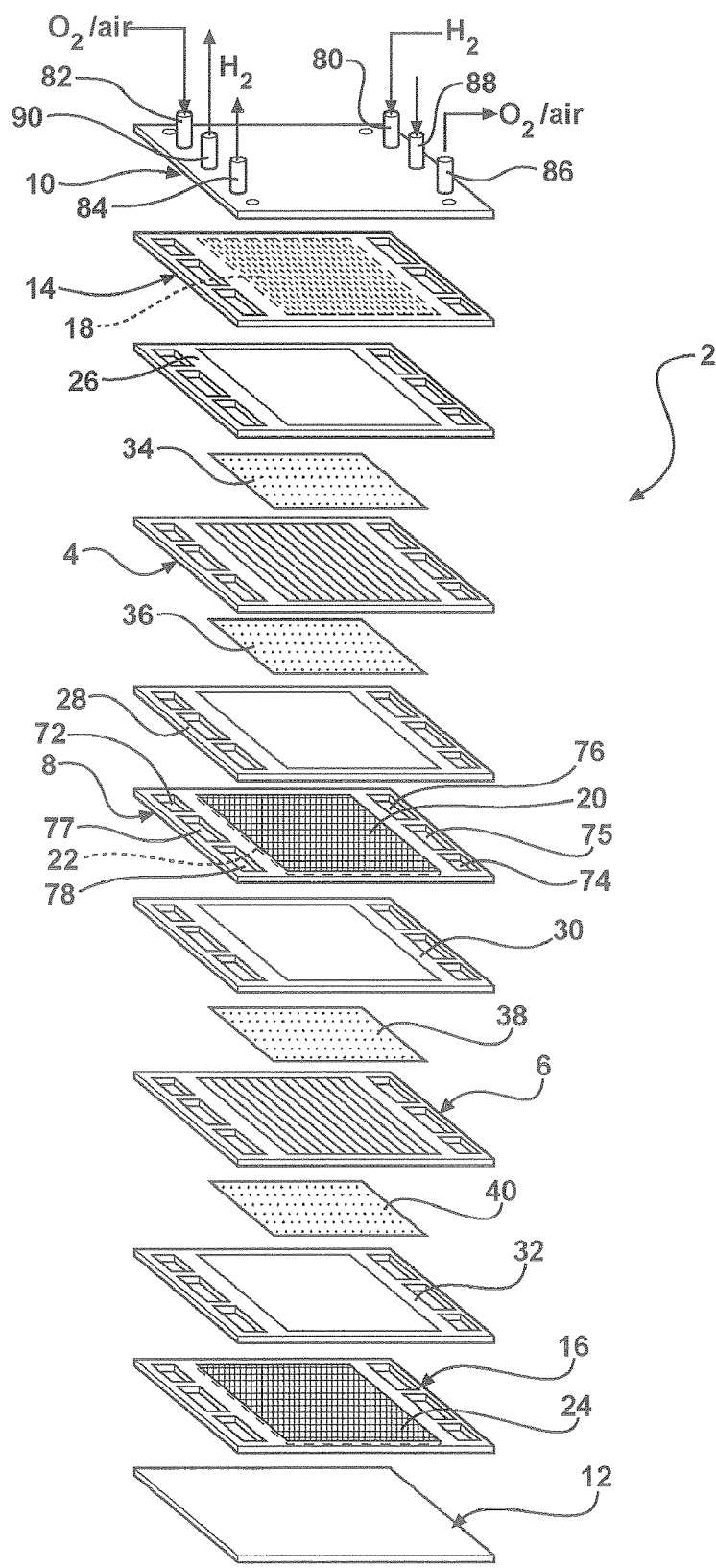
FIG. 1 shows a schematic, exploded perspective view of a PEM fuel cell stack (only two cells shown)

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

For simplicity, only a two-cell stack (i.e. one bipolar plate) is illustrated and described hereafter, it being understood that a typical stack will have many more such cells and bipolar plates.

FIG. 1 depicts a two-cell, bipolar PEM fuel cell stack 2 having a pair of MEAs 4, 6 separated from each other by an electrically conductive bipolar plate 8. The MEAs 4, 6 and bipolar plate 8 are stacked together between a pair of rigid camping plates 10,12, and a pair of monopolar end plates 14, 16. The clamping plates 10, 12 are electrically insulated from the end plates 14, 16 by a gasket or a dielectric coating (not shown). The monopolar end plates 14, 16, as well as both working faces of the bipolar plate 8, include a plurality of grooves or channels 18, 20, 22, 24 defining a flowfield for distributing fuel and oxidant gases (i.e., $H_2$ & $O_2$/air) over the faces of the MEAs 4, 6. Nonconductive gaskets 26, 28, 30, 32 provide seals and an electrical insulation between the several components of the fuel cell stack. Gas-permeable diffusion media 34, 36, 38, 40, e.g. carbon/graphite diffusion papers, abut an anode face and a cathode face of the MEAs 4, 6. The end plates 14, 16 abut the diffusion media 34, 40 respectively, while the bipolar plate 8 abuts the diffusion media 36 on the anode face of MEA 4, and abuts the diffusion media 38 on the cathode face of MEA 6.

An oxidant gas is supplied to the air supply manifold 72 of the fuel cell stack 2 via a cathode inlet conduit 82, while a hydrogen gas is supplied to a hydrogen supply manifold 76 via an anode inlet conduit 80. An anode outlet conduit 84 and a cathode outlet conduit 86 are also provided for the $H_2$ and air exhaust manifolds, respectively. A coolant inlet conduit 88 and a coolant outlet conduit 90 are provided for supplying and removing coolant from, respectively, a coolant inlet manifold 75 and a coolant outlet manifold 77.

As schematically depicted in FIG. 2, the PEM fuel cell stack 2 is included in a fuel cell system 200. The fuel cell system 200 further has a hydrogen storage device 202 in communication with the anode inlet 80 of the fuel cell stack 2. The hydrogen storage device 202 is configured to supply a hydrogen gas 204 to the fuel cell stack 2. A valve 206 is disposed between and in communication with the hydrogen storage device 202 and the fuel cell stack 2. The valve 206 is configured to selectively supply a flow of the hydrogen gas 204 to the fuel cell stack 2 as desired. The fuel cell system 200 further includes an accumulation reservoir 208 in communication with the anode outlet 84 of the fuel cell stack 2. The accumulation reservoir 208 is configured to accumulate a quantity of water 210 and an exhaust stream including the hydrogen gas 204.

In one embodiment, the accumulation reservoir 208 is configured to accumulate the water 210 from the fuel cell stack 2 during a purge event and, with the valve 206 closed, resupply the hydrogen gas 204 to the fuel cell stack 2 after the purge event is complete. The purge event can include, for example, an injection of the hydrogen gas 204 into the fuel cell stack 2 at a pressure or velocity sufficient to cause a quantity of accumulated water 210 to flow from the bipolar plates 8 of the fuel cell stack 2. As shown in FIG. 3, a sufficient velocity of the hydrogen gas 204 is required to affect a flow of the water 210 normally accumulating in the fuel cell stack 2. For example, a purge having a velocity of about 10 m/s for a duration of about 0.1 seconds may be sufficient to move the water 210 accumulating in the fuel cell stack 2 to the accumulation reservoir 208, thereby militating against water stagnation within the fuel cell stack 2.

With renewed reference to FIG. 2, the hydrogen storage device 202 can be any device suitable for storing the hydrogen gas 204. A nonlimiting example of a hydrogen storage device 202 includes a hydrogen storage tank, such as a Type IV pressure vessel, for example. One of ordinary skill in the art should appreciate that other devices for storing hydrogen can also be used.

The accumulation reservoir 208 can include any device suitable for accumulating the hydrogen gas 204 that is exhausted from the fuel cell stack 2. For example, the accumulation reservoir 208 can be a device like the hydrogen storage device 202, such as a pressure vessel. Illustratively, the accumulation reservoir 208 can be a hydrogen storage tank. In one embodiment, the accumulation reservoir 208 can be a second fuel cell stack configured to be pressurized with the exhausted hydrogen gas 204. It should be appreciated that other hydrogen storage devices are suitable for use as the accumulation reservoir 208.

In addition, the accumulation reservoir 208 can include a bleed valve 212. The bleed valve 212 is configured to vent an exhaust stream that includes a nitrogen gas 214. During a period of minimal flow of the hydrogen gas 204, the hydrogen gas 204 is consumed and a relative concentration of the nitrogen gas 214 increases. In one particular embodiment, the bleed valve 212 vents the accumulating nitrogen gas 214 when the relative concentration is near a level where hydrogen starvation can occur in the fuel cell stack 2. For example, the bleed valve 212 can vent as the gas pressure in the accumulation reservoir approaches or nears atmospheric pressure.

The bleed valve 212 can also be configured to drain the quantity of water 210 from the fuel cell stack 2. During the purge event the quantity of water 210 is caused to flow from the fuel cell stack 2 to the accumulation reservoir 208. The water 210 can accumulate in the accumulation reservoir 208 and drain from the system when the bleed valve 212 is opened, for example.

It should be understood that the bleed valve 212 can be disposed at other locations in the fuel cell system 200. As a nonlimiting example, the bleed valve 212 can be in communication with the anode inlet 80, which in turn is in communication with an inlet header (not shown) of the fuel cell stack 2. The inlet header generally has a smaller volume than, and is disposed at a distal location from, the accumulation reservoir 208. It has been found that nitrogen stagnation will first occur at areas of the fuel cell stack 2 disposed at or adjacent to the inlet header. Thus, having the bleed valve 212 in communication with the anode inlet can allow for a more effective bleeding of the nitrogen gas 214 from the fuel cell system 200.

In one embodiment, the flowfields of the fuel cell stack 2 can further have a hydrophilic coating that facilitates removal of accumulating water 210 from the flowfields. Suitable hydrophilic coatings are described, for example, in copending U.S. patent application Ser. Nos. 11/068,489, 11/463,386, and 11/463,384, incorporated herein by reference.

As nonlimiting examples, the hydrophilic coating can include at least one Si—O group, at least one polar group and at least one group including a saturated or unsaturated carbon chain. In further embodiments the coating comprises at least one Si—O group and an Si—R group, wherein R includes a saturated or unsaturated carbon chain and the molar ratio of Si—R groups to Si—O groups ranges from ⅛ to ½. The hydrophilic coating may also be applied by any means sufficient for applying hydrophilic coatings. For example, a coating may be deposited using a plasma assisted chemical deposition process which includes a precursor gas, e.g. a siloxane gas, and further a second gas, e.g. oxygen. Suitable hydrophilic coatings can also includes nanoparticles having a size ranging from 1 to 100 nanometers, wherein the nanoparticles comprise a compound comprising a Si—O group, a saturated or unsaturated carbon chain and a polar group. It should be appreciated that other hydrophilic coatings can also be used.

A surface of the flowfields can also be textured to provide increased hydrophilicity. Surface textures can include a matte finish created, for example by sandblasting. Patterns may also be etched, for example chemically, to provide a desired degree of roughness. Further, the surface of the flowfield may include microcorrugation or microchannels. One of skill in the art should again appreciate that other surface textures providing increased hydrophilicity can also be used.

As shown in, FIG. 3, the hydrogen gas 204 can be intermittently fed from the hydrogen storage device 202 with the valve 206 to the fuel cell stack 2. At the onset of the valve 206 opening, a pressure of the hydrogen gas 204 in the fuel cell stack 2 is minimal. Therefore, the hydrogen gas 204 will move through the fuel cell stack 2 at a velocity and for a time sufficient to purge the anodes of the fuel cell stack 2 of any accumulating water 210. One of ordinary skill should appreciate that a length of the time that the valve 206 is open is dictated by a number of variables. The variables include a starting or minimum anode pressure, a desired maximum anode pressure, and an anode system volume, for example. Similarly, the length of time that the valve is closed is dictated by the rate of consumption of the hydrogen gas 204 by the fuel cell stack 2. When the valve 206 is closed, the hydrogen gas 204 that has collected or accumulated in the accumulation reservoir 208 can flow back into the fuel cell stack 2. There the hydrogen gas 204 is consumed until the pressure reaches a level at which the valve 206 opens again and provides a new flow of the hydrogen gas 204.

As shown in FIG. 4, the fuel cell system 200 of the present disclosure can include a recycle pump 400. The recycle pump 400 is in communication with the fuel cell stack 2 and the accumulation reservoir 208 and is configured to promote a flow of the hydrogen gas 204 through the fuel cell stack 2 when valve 404 is closed. When activated, the recycle pump 400 militates against a localized starvation of hydrogen gas 204 due to nitrogen stagnation in the fuel cell stack 2. The recycle pump 400 maintains a sufficient movement of the hydrogen gas 204 being supplied by the accumulation reservoir 208. In particular, the recycle pump 400 can be used to encourage movement of the hydrogen gas 204 between purge cycles and when hydrogen gas 204 pressures are minimized.

To encourage movement of the hydrogen gas 204 between purge cycles, a bleed of the hydrogen gas 204 from the fuel system can also be used. Such a bleed may be used alone, or in conjunction with, the recycle pump 400. One of ordinary skill in the art should further appreciate that such a bleed system (not shown) can be used to achieve a desired velocity without applying a further parasitic load on the fuel cell stack 200, which would otherwise result if a larger recycle pump 400 were employed.

Also included in the fuel cell system 200 is a vent valve or recycle valve 402 disposed between and in communication with the fuel cell stack 2 and the recycle pump 400. The recycle valve 402 can be used to isolate the recycle pump 400 from the flow of the hydrogen gas 204 when an injector 404 is open to allow a flow of the hydrogen gas 204 from the hydrogen storage device 202. For example, the recycle valve 402 can be configured to isolate the recycle pump 400 from a stream of the hydrogen gas 204 during a purge event.

A tank isolation valve 406 is disposed between and is in communication with the fuel cell stack 2 and the accumulation reservoir 208. During a pulsed flow or the purge event of the hydrogen gas 204, the tank isolation valve 406 can remain open. This allows the hydrogen gas 204 to accumulate in the accumulation reservoir 208. However, the tank isolation valve 406 can also isolate the accumulation reservoir 208 during a continuous supply period of the hydrogen gas 204 from the hydrogen storage device 202. For example, during a cold start of the fuel cell system 200 the liquid water 210 can be more prevalent in the system than during typical operation. While a temperature of the fuel cell stack 200 rises, the tank isolation valve 406 can remain open and the flow of the hydrogen gas 204 and the water 210 can be continuous. When the fuel cell stack 200 reaches an operating temperature, the tank isolation valve 406 is closed intermittently as desired to remove any accumulating water 210. It should be appreciated that a mechanical stressing of the MEAs 4,6 can be minimized when the tank isolation valve 406 is employed intermittently as described.

The fuel cell system 200 can further comprise a water separator (not shown) in communication with the fuel cell stack 2 and the accumulation reservoir 208. The water separator can include, as nonlimiting examples, a coalescing filter, a gravimetric water separator and a centrifugal water separator. In such embodiments, the water separator is configured to remove water 210 from the exhaust stream being resupplied to the fuel cell stack 2, e.g. when the tank isolation valve 406 is open and the hydrogen gas 204 in the accumulation reservoir 208 is being consumed by the fuel cell stack 2. As an example, suitable coalescing filters can include those that function by removing atomized water from the exhaust stream. It should be appreciated that other water separators may also be used as desired.

As depicted in FIG. 5, the fuel cell system 200 includes a jet pump 500 that is configured to promote a flow of the hydrogen gas 204 through the fuel cell stack 2. The jet pump 500 can be in communication with the hydrogen storage device 202 and the fuel cell stack 2. As should be understood, a flow of the hydrogen gas 204 from the hydrogen storage device 202 can produce a vacuum by means of the Venturi effect in the jet pump 500. Thus, the hydrogen gas 204 is recycled through the fuel cell stack 2 and militates against nitrogen stagnation. In one embodiment, the jet pump 500 can provide a recycling flow of the hydrogen gas 204 during the purge event or other period of rigorous flow. In certain embodiments, the jet pump 500 can be used in place of the recycle pump 400. The jet pump 500 can also be used in concert with the recycle pump 400 to promote movement of the hydrogen gas 204 through the fuel cell stack 2.

A fuel cell system 200' having a two-stack architecture including a first fuel cell stack 600 and a second fuel cell stack 602 is illustrated in FIG. 6. In the fuel cell system 200', the first fuel cell stack 600 includes a first anode inlet 80 and a first anode outlet 84. The second fuel cell stack 602 includes a second anode inlet 80' and a second anode outlet 84'. The first anode inlet 80 and the second anode inlet 80' are in communication with the hydrogen storage device 202. The hydrogen storage device 202 is configured to supply the hydrogen gas 204 to the first fuel cell stack 600 and the second fuel cell stack 602 on an individual basis. The hydrogen gas 204 can be supplied to the first and second fuel cells stacks 600, 602 on an alternating basis, for example. In one embodiment, a first injector 604 is disposed between and in communication with the hydrogen storage device 202 and the anode inlet 80 of the first fuel cell stack 600. The first injector 604 is configured to intermittently supply the hydrogen gas 204 to the first fuel cell stack 600. Similarly, a second injector 606 is disposed between and in be in communication with the hydrogen storage device 202 and the second anode inlet 80' of the second fuel cell stack 602. The second injector 606 can be configured to intermittently supply the hydrogen gas 204 to the second fuel cell stack 602. The first and second injectors 604, 606 can be configured to work in concert and alternately supply the hydrogen gas 204 to the fuel cell stacks 600, 602. It should be understood that alternative means for supply the hydrogen gas 204 to the fuel cell stacks 600, 602 on an individual basis, e.g. a valve, can also be used as desired. It is also understood that additional fuel cell stacks can be used as desired.

The fuel cell system 200' may also include the water separator (not shown). The water separator is typically disposed between the fuel cell stacks 600, 602 and is adapted to inhibit a flooding the first and second fuel cell stacks 600, 602. For example, the water separator militates against a discharge of liquid water from the first fuel cell stack 600 to the second fuel cell stack 602, or from the second fuel cell stack 602 to the first fuel cell stack 600. The liquid water accumulated in the separator is exhausted from the system, for example, by the bleed valve 212.

FIG. 6 further includes the recycle pump 400 being in communication with both the first fuel cell stack 600 and the second fuel cell stack 602. As described herein, the recycle pump 400 promotes the flow of the hydrogen gas 204 through the first and second fuel cell stacks 600, 602, particularly during a phase where the hydrogen gas 204 is not being supplied by the hydrogen storage device 202 to the fuel cell stack 600, 602. Thus, the recycle pump 400 militates against nitrogen stagnation in the fuel cell stacks 600, 602 that could otherwise form in localized areas if an insubstantial flow, for example during an "off" cycle, of the hydrogen gas 204 were to occur. The fuel cell system 200' illustrated in FIG. 6 nay also include a bleed valve 212 which can function to vent the nitrogen gas 214 and to drain the water 210 accumulating in the system 200.

The fuel cell system 200' described in FIG. 6 can also be arranged as a fuel cell system 200" shown in FIG. 7. The first fuel cell stack 600 and the second fuel cell stack 602 can be replaced by a single fuel cell stack 700 being partitioned to form respective fuel cell stacks 600' and 602'. For example, the fuel cell stack 700 can be partitioned with a partition plate 702. Accordingly, it should be appreciated that the fuel cell system 200" as depicted in FIG. 7 can operate substantially the same as the fuel cell system 200' depicted in FIG. 6. More than one fuel cell system 200" can also be used in series with respect to the recycle flow, instead of in parallel as show in FIG. 7.

In one embodiment, the present disclosure includes a method of operating the fuel cell system 200. The method includes supplying the fuel cell stack 2 having an anode with the hydrogen gas 204 from the hydrogen storage device 202, wherein a pressure from the hydrogen gas 204 militates against an accumulation of water 210 on the anode. For example, the pressure of the hydrogen gas 204 during a purge event can be sufficient to move the quantity of water 210 from the anode. The purge event can occur in an intermittent fashion, thus periodically removing the quantity of water 210 from the fuel cell stack 2. As nonlimiting examples, the intermittent purge can occur at a rate of at least about 2 meters/second for a duration of less than about 1 second. In one particular embodiment, the purge rate is at least about 5 meters/second for a duration of less than about 0.5 seconds. It should be appreciated that other purge rates and durations sufficient to move the water 210 can be used as desired.

The method further includes collecting the water 210 and an exhaust stream including the hydrogen gas 204 in the accumulation reservoir 208. Following the collection step, the exhaust stream collected in the accumulation reservoir 208 is resupplied to the fuel cell stack 2 as a fuel. The method can further comprise supplying the hydrogen gas 204 from the hydrogen storage device 202 to the fuel cell stack 2 after the resupply from the accumulation reservoir 208, but before a localized nitrogen starvation of the anode occurs.

In a further embodiment, the method includes pumping the exhaust having the hydrogen gas 204 through the fuel cell stack 2 at a rate sufficient to militate against a localized starvation of the anode. The pumping can be effected, for example, through use of the recycle pump 400 and/or the jet pump 500 of the present invention. However, it should be appreciated that alternative means for moving the hydrogen gas 204, e.g. during a phase where the hydrogen gas 204 is not being actively provided by the hydrogen storage device 202, can be used as desired.

It should be further understood that the present method can include a venting of the exhaust stream, including the accumulating nitrogen gas 214, from the fuel cell system 200 prior to a starvation of the anode. Such a venting can occur on a temporally intermittent basis, for example. The venting can also be based on a measurement of a relative concentration of the hydrogen gas 204 to the nitrogen gas 214 in the exhaust stream. The method can also include a draining of the quantity of water 210 from the fuel cell system 200 after the purge event. For example, the water 210 purged from the fuel cell stack 2 by the pressure of the hydrogen gas 204 from the hydrogen storage tank 202 can flow to the accumulation reservoir 208 where it is drained. Alternate locations for drainage in the fuel cell system 200 can further be selected as described herein.

The fuel cell system 200 and method of the present disclosure facilitate water 210 removal from the fuel cell stack 2, and in particular from the anodes of the fuel cell stack 2. Thus, it should be appreciated that the present invention militates against cathode carbon corrosion and generally improves the durability of the fuel cell stack 2.

Furthermore, the present invention can militate against a start-stop degradation of the fuel cell stack 2 by removing the water 210 from the anode prior to a shut-down of the stack 2. The start-stop degradation phenomenon occurs when a scarcity of the hydrogen gas 204 at the anode causes undesirable potentials, for example a reversal of polarity where the cathode becomes more negative than the anode. In such situations the bipolar plate, electrodes, and catalyst may begin to oxidize, thus harming the fuel cell stack 2 performance. With the removal of the water 210 according to the present system and method, it has surprisingly been found that such a degradation can be inhibited.

It should be further recognized that the purging of the fuel cell stack 2 with the hydrogen gas 204 is a result of a pressure in the hydrogen storage device 202. Thus, the gas velocity required to remove liquid water 210 can be achieved without the use of a recirculation pump, which would typically act as a parasitic load and reduce the system energy efficiency. Thus, the present invention is effective and efficient in removal of liquid water 210.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fuel cell system comprising:
a fuel cell stack including a PEM fuel cell having an anode and a cathode, the fuel cell stack further including an anode inlet and an anode outlet;
a hydrogen storage device in communication with the anode inlet and configured to supply a hydrogen gas to the fuel cell stack; and
an accumulation reservoir in communication with the anode outlet of the fuel cell stack, a valve disposed between the fuel cell stack and the accumulation reservoir, wherein the valve is configured to isolate the accumulation reservoir from the fuel cell stack during a supply of the hydrogen gas from the hydrogen storage device, and wherein the accumulation reservoir accumulates at least one of a quantity of water and an exhaust stream including the hydrogen gas during a purge event, and resupplies the exhaust stream to the fuel cell stack through the anode outlet of the fuel cell stack.

2. The fuel cell system of claim 1 further comprising: a recycle pump disposed between the fuel cell stack and the accumulation reservoir, wherein the recycle pump promotes a flow of the exhaust stream through the fuel cell stack.

3. The fuel cell system of claim 2, wherein the recycle pump is a jet pump.

4. The fuel cell system of claim 2 further comprising: a valve disposed between the fuel cell stack and the recycle pump, wherein the valve is configured to isolate the recycle pump from the exhaust stream during the purge event.

5. The fuel cell system of claim 1, wherein the accumulation reservoir is a pressure vessel.

6. The fuel cell system of claim 1, further comprising a bleed valve configured to vent the exhaust stream and the quantity of water.

7. The fuel cell system of claim 6, wherein the bleed valve is in communication with the anode inlet.

8. The fuel cell system of claim 6, wherein the bleed valve is in communication with the accumulation reservoir.

9. The fuel cell system of claim 1, further comprising a water separator disposed between the fuel cell stack and the accumulation reservoir, wherein the water separator is configured to remove water from the exhaust stream being resupplied to the fuel cell stack.

10. The fuel cell system of claim 1, the fuel cell stack including a flowfield configured to distribute the hydrogen gas, the flowfield having a hydrophilic coating disposed thereon.

11. A method of operating a fuel cell system comprising
supplying a fuel cell stack having an anode with a hydrogen gas from a hydrogen storage device, wherein a flow of the hydrogen gas through the anode militates against an accumulation of a quantity of water on the anode;
collecting the water and an exhaust stream including the hydrogen gas in an accumulation reservoir; and
resupplying the exhaust stream collected in the accumulation reservoir to the fuel cell stack through the anode outlet of the fuel cell stack.

12. The method of claim 11, wherein the supplying of the hydrogen gas is provided in an intermittent purge.

13. The method of claim 12, wherein the intermittent purge has a rate of at least about 5 meters/second for a duration of less than about 0.5 seconds.

14. The method of claim 11, further comprising supplying a hydrogen feed stream from the hydrogen storage device to the fuel cell stack after the resupply from the accumulation reservoir and before a starvation of the anode from the exhaust stream.

15. The method of claim 11, wherein the resupplying of the exhaust stream further includes pumping the exhaust stream through the fuel cell stack at a rate sufficient to militate against a localized anode starvation.

16. The method of claim 11, further comprising venting the exhaust stream from the fuel cell system prior to a starvation of the anode.

* * * * *